United States Patent [19]
Whiteman

[11] Patent Number: 5,846,425
[45] Date of Patent: Dec. 8, 1998

[54] METHODS FOR TREATMENT OF WASTE STREAMS

[76] Inventor: George R. Whiteman, 3050 Boles Farm La., Duluth, Ga. 30136

[21] Appl. No.: 583,208

[22] Filed: Jan. 3, 1996

Related U.S. Application Data

[63] Continuation-in-part of Ser. No. 279,297, Jul. 22, 1994, abandoned.

[51] Int. Cl.$^6$ ............................ C02F 11/12; C02F 11/14
[52] U.S. Cl. ..................... 210/606; 210/609; 210/610; 210/613; 210/623; 210/625; 210/631
[58] Field of Search ................................... 210/603, 606, 210/609, 610, 612, 613, 623, 625, 631, 703, 768, 769, 790, 804, 173

[56] References Cited

U.S. PATENT DOCUMENTS

| | | |
|---|---|---|
| 2,209,613 | 7/1940 | Roeder . |
| 3,652,406 | 3/1972 | Westberg ............................... 210/610 |
| 3,806,448 | 4/1974 | Smith et al. . |
| 3,959,124 | 5/1976 | Tchobanoglous . |
| 3,997,487 | 12/1976 | Prince et al. . |
| 4,053,394 | 10/1977 | Fisk . |
| 4,159,944 | 7/1979 | Erickson et al. . |
| 4,297,122 | 10/1981 | Wallace ................................... 210/610 |
| 4,341,632 | 7/1982 | Gregor et al. . |
| 4,342,650 | 8/1982 | Erickson et al. . |
| 4,784,770 | 11/1988 | Nagao ..................................... 210/603 |
| 4,943,378 | 7/1990 | Flesher et al. . |
| 4,985,149 | 1/1991 | Ohshima et al. ....................... 210/613 |
| 5,019,267 | 5/1991 | Eberhard et al. ....................... 210/606 |
| 5,154,831 | 10/1992 | Darian et al. . |
| 5,240,599 | 8/1993 | Kew et al. . |
| 5,282,980 | 2/1994 | Kew et al. .............................. 210/173 |

FOREIGN PATENT DOCUMENTS

| | | |
|---|---|---|
| 0293374 B1 | 1/1992 | European Pat. Off. . |
| WO87/04423 | 7/1987 | WIPO . |

OTHER PUBLICATIONS

"The Seber (Colloid Mill) Process Index," Aquadec, Ltd., London, England, Dec. 1988.

Schall, Gisbert, "Developments in the Field of Wet-grinding and Dispersing," *Drais News,* vol. 1, No. 1, Draiswerke, Inc., Allendale, NJ 07401.

Stehr, Norbert, "Residence Time Distributions in a Stirred Ball Mill and their Effect on Comminution," *Drais News,* vol. 1, No. 2, Draiswerke, Inc., Allendale, NJ 07401.

Springer, A.M., Dietrich-Velazquez, G., and Higby, C., "Feasibility Study of Sludge Lysis and Recycle in the Activated Sludge Process," *TAPPI Proceedings,* pp. 761–771, 1993 Environmental Conference.

*Primary Examiner*—Peter A. Hruskoci
*Assistant Examiner*—Theodore M. Green
*Attorney, Agent, or Firm*—Brinks Hofer Gilson & Lione

[57] ABSTRACT

A method for treating wastewater is useful in treatment of biomass (sludge) resulting from wastewater treatment, particularly for biological sludges of aerobic, facultative and/or anaerobic origin. The invention relates fractionation of microorganisms and organic materials within the sludge by mechanical shearing, in combination with heat, chemical and/or biochemical treatment to improve waste treatment and to release nutrients for recirculation for use by microorganisms in the waste treatment system.

20 Claims, 4 Drawing Sheets

FIG. 1 (A): EXAMPLES OF ABS APPLICATION OF COLLOID MILL PROCESSING USING

FIG. 2(A): EXAMPLES OF ABS APPLICATION OF COLLOID MILL PROCESSING USING

METHODS FOR TREATMENT OF WASTE STREAMS

This application is a continuation-in-part of U.S. application Ser. No. 08/279,297, filed Jul. 22, 1994 now abandoned.

BACKGROUND OF THE INVENTION

The present invention relates to methods and compositions for treatment of waste steams, particularly for treatment of aerobic, facultative and anaerobic biological sludges resulting from treatment of wastewater and storage of oil. The invention particularly relates to a closed loop treatment of sludge by high level of shearing at one or more steps to effect recirculation of nutrients released from disruption of microorganisms in the sludge.

Protection of the environment has been a top priority issue in the United States for more than 30 years. In the early 1950's, the Federal Government developed an ambitious program to encourage the construction of wastewater treatment plants. According to Springer et al. (1993), the number of such facilities exceeds 15,000, most of which use an activated sludge process. In this process, microorganisms in the sludge transform organic compounds present in the wastewater into carbon dioxide, water and new microbial cells.

The amount of organic material can be determined indirectly as Biochemical Oxygen Demand ("BOD"). Forty to sixty-five percent of the BOD is generally transformed into new cells in the activated sludge process. The new cells generated are separated from the system and disposed of as "waste activated sludge."

The activated sludge process therefore transforms a substantial part of the organic components present in wastewater into excess sludge. The excess sludge must be disposed of in a manner consistent with environmental law. A limitation of an activated sludge process is that it transfers a water pollution control problem into a solids waste disposal problem. The disposal cost for waste activated sludge from municipal wastewater treatment plants alone is estimated to be two billion dollars per year. It is clear that disposal of waste activated sludge is a significant expense in wastewater treatment processes.

Some wastewater treatment plants use a supplementary anaerobic digestion process to digest the waste activated sludge, in order to reduce the amount of solids for ultimate disposal. Anaerobic systems produce the end products methane, carbon dioxide, water and new microbial cells. Since methane and carbon dioxide are sinks for stabilizing the carbon in organic matter, anaerobic systems produce about one fifth to one tenth the amount of the sludge produced by an aerobic system. The solids reduction efficiency of anaerobic systems treating waste activated sludge is about 50%, and the final disposal problem is minimized but not eliminated. As a result, other means are desired to deal with the disposal problem.

Gaudy et al. (1971) explored an extended aeration concept, a variation of the activated sludge process. Extended aeration involves a total recycle of the waste activated sludge to the reactors for further processing. These investigators reported that a bench-scale, extended aeration system operated over 1,000 days and performed well. However, the microbial population showed prolonged growth and death periods. To avoid this problem, the waste activated sludge was digested in either acidic or alkaline conditions at elevated pressures and temperatures. Although these bench-scale plants performed well, the high costs projected for the physical-chemical digestion made the process economically prohibitive on a commercial scale.

Ultrasonic treatment of sludge has been attempted. This process also is economically unfeasible because it is unacceptably energy intensive.

EP 293 374 (Olley) relates to treatment of wastewater from an aerobic biological wastewater treatment plant and attempts to reduce the quantity of sludge produced in an aerobic waste treatment system by passing at least some of the solids through a cell rupture means. The process relates to sludge disposal from an aerobic system. A process for use with anaerobic or facultative (combined aerobic and anaerobic) systems is not disclosed. Nor has the disclosed method ever been adopted commercially for use in wastewater treatment.

In a bench-scale set of experiments, Springer (1993) explored whether use of a cell destruction step in an activated sludge process conferred any benefits. However, the authors noted that neither high shear nor boiling point temperatures alone were sufficient to provide an acceptable degree of cell destruction, contradicting the disclosure of EP 293 374. The authors conclude that the process is not economically feasible on an industrial scale, although they cautiously postulate that the process may be an alternative wastewater treatment system applicable in the pulp and paper industry for waste applicable mills which operate well within EPA permit discharge limits.

Several methods currently are used by biochemists on a laboratory scale to disrupt microbes in order to study internal components. For example, Kelly and Hite (1955) estimate that 10 minutes at 55°–65° C. of moist heat will kill most non-sporulating bacteria. Enzymes in combination with chemical agents are discussed by Levy, Campbell and Blackburn (1973), such as proteases or lysozyme for lysis of gram-positive bacteria or lysozyme in combination with ethylenediaminetetraacetic acid (EDTA) for gram-negative bacteria. Lehninger (1975) discusses use of homogenization shear forces and an isotonic sucrose solution.

Various proposals to comminute waste products are available, but such disruption is at a relatively crude level, producing large particle sizes, or is not directed at recirculation. For example, a "chain mill or disintegrator" which flails material by means of a rotating shaft and chains to "at least as small as 8 mesh" is used to remove inert matter during the treatment of waste material. A disintegrator includes a hammer mill or a cage mill.

A method of Fisk discloses a water treatment system where the sludge is dewatered and then treated in a series of digesters, Kew is directed toward a dewatering process. Any incidental cell disruption to "sugars and proteins" is sought by Kew to reduce the quantity of solids to be disposed. (col. 7, lines 3–5).

In a method of Erickson ('944) cells are ruptured so that "the resultant micro-particulate effluent is thereby conditioned for effective chelation treatment to remove heavy metal ions and for effective disinfection with reduced requirements for toxic reactants. The product is discharged as agricultural irrigation water . . . " (Abstract; col. 4, lines 37–44, 60–65; col. 8, lines 26–36, 44–47.) Disruption is not directed toward release of nutrients from microbial cells to recirculate and support bacterial growth in the system.

Because of increasingly tighter National Pollution Discharge Elimination Systems (NPDES) permits, industry must optimize the performance of waste treatment systems. Optimization requires the use of costly nutrients. Process safety management has also become an increasingly important driving force in the search for alternatives to aqueous ammonia as a nutrient source. Satisfactory commercial systems of sludge treatment are lacking and existing technology is becoming increasingly expensive. An alternative process that minimizes sludge disposal and the need for external nutrient sources while satisfying process safety management issues by eliminating aqueous ammonia is desired. Such a process would be useful in treating a range of sludges from water treatment, oil storage and wastewater treatment including primary sludge and biological sludge from anaerobic, facultative and aerobic systems.

SUMMARY OF THE INVENTION

An aspect of the invention is to provide a process that can handle a range of sludges, including primary sludge and biological sludge from anaerobic, facultative and aerobic systems. The invention provides a process for wastewater treatment resulting in biological sludge without nutrient supplementation or with reduced nutrient supplementation because nutrients are recirculated within the treatment system by disruption of microorganisms in the sludge.

Disruption of microorganisms is effected by fractionating them by shearing forces so that the integrity of the microorganisms is broken down to release intracellular nutrients. The shearing forces are mechanical forces that produce substantially particles that are 2 microns or less in diameter. Two microns by 0.5 microns is an average size of bacteria that are the principal components of the waste treatment sludge that is a target of the methods of the present invention. In addition to mechanical shearing forces, other pretreatment or concurrent treatment of the sludge by heat, chemical or biochemical agents, facilitates microorganism disruption.

It is an object of the present invention to provide an improved, cost-effective method for wastewater treatment.

It is a further object of the invention to provide a method of treating sludges from oil storage and wastewater treatment.

In accordance with these and other objects according to the invention, there is provided a method of treating a waste stream, comprising the steps of mechanically shearing a waste stream to emulsify and disperse fats and oils during pretreatment, and then subjecting the waste stream to primary treatment. There also is provided a method of treating a waste stream, comprising the steps of subjecting the waste stream to a primary treatment step, and mechanically shearing the waste stream at a level such that particles formed are 2 microns or smaller before or after the primary treatment step. The primary treatment step may be a dissolved air flotation step, in which case the mechanical shearing step is before the dissolved air flotation step. Alternatively, the primary treatment step is concentration of primary sludge, in which case the mechanical shearing step is after the primary sludge concentration step.

There also is provided in accordance with the present invention a method of treating a waste stream, comprising the steps of subjecting a waste stream to a secondary, biological treatment step in which organic components in the waste stream are transformed into biomass, fractionating the biomass using mechanical shearing, at a level such that a substantial proportion of particles formed are 2 microns or smaller and recirculating nutrients are released by the fractionation of the biomass to the biological treatment step. Among the smallest constituents of the biomass are bacteria, which average about 2 $\mu$m by 0.5 $\mu$m in size. Thus, fractionating the biomass to levels below 2 $\mu$m ensures that the biomass will be sufficiently disrupted to release nutrients from microorganisms which then become available for recycling. In a preferred embodiment, the biomass is pretreated or concurrently treated with at least one of chemicals, biochemicals and heat. The step of pretreating the biomass may be a step of pretreating the biomass with an industrial waste stream, or a slip stream thereof, particularly a waste stream from a kraft mill. The waste stream preferably is processed without nutrient supplementation.

There additionally may be a step of concentrating output from the secondary, biological treatment step in a secondary clarifier. The step of fractionating the biomass at a level such that a substantial proportion of particles formed are 2 microns or smaller can be between the step of secondary, biological treatment and the step of concentrating output of the secondary, biological treatment step in the secondary clarifier, or it can be after the step of concentrating output of the secondary, biological treatment step in the secondary clarifier. The step of concentrating output of the secondary, biological treatment step in the secondary clarifier may be followed by a thickening step employing gravity or flotation, and biomass also may be fractionated to particle sizes of about 2 microns or less after the gravity or flotation step. Nutrients released during these secondary treatment and concentrating steps may be recirculated to the biological treatment step.

The steps of secondary, biological treatment and concentrating output from the secondary, biological treatment step may be followed by a step of treating fractionated output from these steps in an anaerobic digester, the contents of which also may be mechanically sheared. Alternatively, the steps of secondary, biological treatment and concentrating output from the secondary, biological treatment step may be followed by a tertiary treatment step, and the output of the tertiary step also may be mechanically sheared, before being sent to an anaerobic digester or to a final sludge treatment step.

The present invention also provides a method of treating a waste stream, comprising the steps of collecting sludge for final disposal, mechanically shearing the sludge after the sludge pretreatment step, recirculating nutrients released by the fractionation of the sludge to a biological treatment step, and finally disposing of the sheared sludge. In a preferred embodiment, the biomass is pretreated with at least one of chemicals, biochemicals and heat. The sludge may be combined primary and secondary sludges.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENT

The present invention provides a method that disrupts microorganisms within waste water sludge at one or more steps during treatment, to release intracellular nutrients for recirculation. Shearing forces are used for the disruption, aided by pretreatment or concurrent treatment with heat and/or chemical or biochemical agents. In the present context, a waste stream includes both liquid wastewater and solid or semi-solid sludge. Shearing forces are used in connection with both the liquid wastewater and sludge components of a waste stream.

Shearing forces are useful in pretreatment and/or primary wastewater treatment processes and in treatment of sludge from an oil storage facility. In this case, shearing is used primarily for dispersing and emulsifying organic materials in the wastewater such as fats, oils and greases.

Shearing forces also can be used for fractionation of the sludge component of a waste stream. Fractionation in accordance with the present invention is the dispersion and disruption of microbial cells including bacteria in an amount sufficient to release cell contents into a fluid phase of a wastewater treatment system. The microbial cells primarily are those used in biological treatment of wastewater, that is, in secondary wastewater treatment processes. In addition to disruption of the cells, an important function of shearing in fractionating sludge is dispersion of the sludge components, making disruption and release of cell contents more effective. Thus, fractionation entails dispersion of sludge aggregates and disruption of individual microorganisms.

Fractionation provides nutrient recirculation, increasing the availability of organic pollutants and nutrients to microbes. The liquor resulting from the action of microorganisms on materials contains high levels of nitrogen, phosphorus and micronutrients which are returned to the aerobic, anaerobic or facultative treatment system. Active biomass contains 8–15% nitrogen for most bacteria, most typically about 12 to 12.5%, and 2–5% phosphorus, most typically about 2.3–2.6% Table 1 reports the result of death or disruption of a cell for several microorganisms.

TABLE 1

| CONTENT | YEAST | BACTERIA | ZOOGLOEA |
|---|---|---|---|
| Carbon | 47.0 | 47.7 | 44.9 |
| Hydrogen | 6.0 | 5.7 | — |
| Oxygen | 32.5 | 27.0 | — |
| Nitrogen | 8.5 | 11.3 | 9.9 |
| Ash | 6.0 | 8.3 | — |
| Empirical formula | $C_{13}H_{20}N_2O_7$ | $C_5H_7NO$ | — |
| Carbon to Nitrogen Ratio | 5.6:1 | 4.3:1 | 4.5:1 |

From Eckenfelder, supra, at page 294.

In addition to simple nutrients, complex compounds within cells also are released by microbial disruption, including deoxyribonucleic acid (DNA), ribonucleic acid (RNA), amino acids, coenzymes, vitamins, folic acid, and adenosine triphosphate/diphosphate (ATP/ADP). These compounds are essential to life and to the formation of new biomass used to continue the degradation of organic matter. The importance of these internal cell compounds has recently been highlighted by the commercialization of a folic acid additive, called Bioprime, used for enhancing waste treatment systems.

The benefits of nutrient supplementation are reported in Eckenfelder, supra, and are reproduced in Table 2. The benefits of nutrient supplementation are achieved by nutrient recirculation resulting from cell lysis according to the present invention.

TABLE 2

| WASTE | WITHOUT NUTRIENTS | WITH NUTRIENTS | INCREASE (%) |
|---|---|---|---|
| Kraft mill 1 | 0.35 | 1.33 | 380 |
| Kraft mill 2 | 0.26 | 1.50 | 577 |
| Board mill | 0.70 | 3.20 | 457 |
| Hardboard mill | 0.34 | 1.66 | 488 |

The increases in efficiency produced by increased levels of nutrients available by cell lysis translate not only to a reduction or elimination in the need for nutrient supplements that are expensive, but also can result in the design of smaller systems, with the consequent benefits of lower capital and operating costs.

Shearing is achieved by means of a mechanical shearing device. Suitable mechanical shearing devices include colloid mills, propeller mixers and high pressure homogenizers. Particularly high shearing forces are achieved by mechanical means such as a colloid mill, a Ball mill, or a Cowles or IKA dispenser. For example, ball mills are capable of grinding material in a range of 0.25–2.0 $\mu$m (Drais News).

Ultrafine wet grinding mills produce particle size distributions that are determined by the mills' manufacturers (e.g. Drais News), according to operational speed and solid concentration parameters. These parameters are selected to operate a mill for purposes of the present invention so that sufficient nutrients are released to replenish the system.

For purposes of the present invention, the "substantial" proportion of the microorganisms in a sludge that need to be disrupted is a proportion that would release sufficient nutrients to adequately offset that amount of supplemental nutrients added to maintain the wastewater treatment system prior to implementation of methods of the present invention. To "adequately" offset supplemental nutrients means to produce a level of nutrients by microorganism disruption that is sufficiently similar to that level required to maintain the system when using supplemental nutrients. In certain cases, a user may decide not to totally replace the supplemental nutrients. The methods of the present invention are flexible enough to provide for such a choice.

To determine how much of each type of nutrient is released by mechanical shearing forces alone or in combination with other treatments, a sample of the type of sludge to be processed is placed in a device such as a ball mill or colloid mill, and operated at speeds and times already known by the manufacturer to produce a substantial proportion of particles of a size about 2 microns or less in diameter (see, e.g. Drais News). Nutrient output is then analyzed for nutrients of interest to the user. If the sample does not yield sufficient nutrients to maintain the system, said information being extrapolated from the volume of the sample to the volume of sludge to be processed in a fixed time interval, mill parameters such as time and speed are altered until a suitable level of nutrients is released.

A skilled artisan would consult a source of commercially available manufacturers or vendors of the mechanical shearing devices disclosed, such as Thomas' Register to select a device or devices suitable for the stated goal of the invention-to disrupt microbes thereby releasing their intracellular nutrients and recycling them within waste treatment systems. For example, among the companies listed at Section "3559 Mills-Colloid" of Thomas' Register, a source well-known to those of skill in the art is Draiswerke, Inc. of Mahwah, N.J. Draiswerke manufactures ball mills and prints a newsletter which contains a detailed description of the mechanics of ball mills capable of shearing material to various sizes. A skilled artisan would know that bacteria are among the smallest microbial cells which would constitute the biomass, and that the average size of bacteria is about 2 μm. Therefore, an artisan would look for mechanical shearing devices capable of disrupting material to a level finer than 2 μm.

Fractionation of sludges by mechanical shearing preferably is accompanied by chemical, biochemical or heat treatment in accordance with the present invention, since mechanical shearing devices that are commercially available are not as effective in fractionation of sludge as when combined with other agents. In order to make fractionation by mechanical shearing effective, sludge first is pretreated or concurrently heated with chemicals, biochemicals and/or heat in order to weaken the cell so that mechanical shearing can disperse and disrupt the cells. Chemical means such as acids, caustics and surfactants, and biochemical means such as enzymes (for example, lysozymes, cellulases or proteases) or combinations of these agents are used in conjunction with the mechanical device. Suitable surfactants and chemicals as discussed by Kelly and Hite (1955) include surfactants such as Tween® 80, a non-ionic surfactant, a sodium lauryl sulfate such as Duponal® WA, a cationic surfactant or an akyldimethyl benzyl ammonium chloride, such as that sold under the trade names Zephiran®, Roccal®, Phemerol®, Ceepryn® and Cetab®. With respect to dispersion of fats and oils, the use of surfactants is preferred. Acidic agents include strong mineral acids, such as sulfuric or hydrochloric acids, and caustic agents include slaked lime and sodium hydroxide. Difco (1984) lists caustic agents such as sodium azide as a bacteriostatic inhibitor of gram-negative organisms.

If chemicals, biochemicals or energy for heat must be purchased, the pretreatment in conjunction with the mechanical shearing renders a process that may not be cost-competitive in the marketplace. It has been discovered, however, that this process can be made cost-effective in one of two ways. The first way to provide a cost-effective process is to use an essentially "free" source of chemicals or heat. In certain applications waste streams contain surfactants, acidic agents and/or caustic agents, or waste streams that contain surfactants, acidic agents and/or caustic agents are readily available. For example, certain industrial waste streams, particularly those in the paper industry such as kraft mills, can be used to provide a chemical pretreatment.

Kraft mills have two major waste streams: a caustic waste stream called black liquor and an acid waste stream from the bleaching process. The surfactants, acidic and/or caustic agents present in these waste streams can be used in a side stream process as part of an ABS step (FIG. 1) for fractionation of sludge. Such a waste stream can even be used during processing of other waste, for example, municipal waste. The economic feasibility of such use depends on sludge holding times, sludge quantities and distance of the individual streams from the sludge handling and waste treatment facility.

In addition to surfactants, and acidic and caustic agents, heat can also be used in fractionation. Microbiologists have used heat as a method of disinfection or killing microbes for decades. Similar principles apply to the treatment of biological sludges to achieve disruption of the microorganisms. The most cost-effective approach to fractionation of sludge in any case is site dependent, and involves shearing in combination with any one or more of chemical, biochemical or heat treatment.

Different combined approaches may be required to address the different structural characteristics of microbial membranes. Gram-positive bacteria contain mainly polysaccharide cell walls which can be attacked by lysozyme at the beta(1–4) glycosidic bonds, which yields N-acetyl-d-glucosamine and N-acetylmuramic acid weakening the backbone of the cell wall and leads to cell lysis. Gram-negative bacteria contain an outer lipopolysaccharide/lipoprotein layer that protects against lysozyme action, and pretreatment by EDTA according to Levy et al. (1973) can be used to remove the outer layer rendering the gram-negative microbes sensitive to lysozyme.

A second way to provide a cost-effective process is to recycle nutrients released by cell disruption of the biomass, including its constituent bacteria, to the biological treatment step. Fractionation in accordance with the present invention releases essential nutrients which are recycled for use by microorganisms in the waste treatment system. This drastically increases the efficiency of the biological treatment and thus balances any increased cost due to the mechanical shearing and pretreatment, and eliminates the use of nutrient supplementation in processes that use such supplementation. Supplemental nutrients add greatly to the cost of wastewater treatment. For example, a typical 40 MGD kraft mill is estimated to spend $200,000–$500,000 per year on supplemental nutrients, while a 15 MGD recycle mill may spend $100,000–$200,000 on such nutrients.

Cost savings realized by the present process also result from increased biological activity per unit volume of treatment, and from reduction and/or elimination of the need for sludge disposal. The present process reduces the final amount of sludge to be disposed to less than 20–50%, with only inert material remaining depending on the make up of the sludge processed. In addition, the present process reduces or eliminates the need for conventional chemical treatment, e.g., with polymers, for thickening waste and for sludge disposal. Other benefits of the present invention include enhancement of methane production to produce more electricity from anaerobic systems and enhancement of throughput which reduces the required retention time, in turn reducing capital and/or operating costs.

There follows a description of an overall scheme of wastewater treatment which includes an explanation of where and how fractionation in accordance with the present invention expedient can be implemented. The description is best understood with reference to FIG. 1, which shows a sequence of steps for the treatment of wastewater. Points at which mechanical shearing to achieve disruption of microorganisms by a force sufficient to release intracellular nutrients for recirculation in accordance with the present invention can be employed, are designated on the drawing as "an ABS step." An ABS step is defined as a step of mechanical shearing. When mechanical shearing is used to fractionate microbial cells, it is preferably accompanied by a pretreatment, or concurrent treatment with other agents, as described above to weaken the cells. A number assigned to the step designates the position of mechanical shearing in a treatment system. More particularly, the location of a mechanical shearing step of the present invention are is in FIG. 1 by "ABS #," with ABS # going from ABS 1–13 to indicate where mechanical shearing may be inserted in the treatment process.

Wastewater treatment comprises steps of pretreatment, primary treatment, secondary treatment and tertiary treatment. Pretreatment entails the removal of floating materials, coarse solids and grit, which may include fats, oils and grease. Primary treatment is removal of suspended solids that settle upon standing. Secondary treatment is a biological treatment, generally to remove BOD, followed by secondary clarification to remove biomass formed in the process prior to further treatment or disposal of the liquid. Biological processes are used to convert the finely divided and dissolved organic matter in wastewater into flocculent solids that will settle on standing and that can be removed in sedimentation tanks. These biological processes are most efficient in removing organic substances that are either soluble or in the colloidal size range. Secondary processes are employed in conjunction with the physical and chemical processes that are used for the primary treatment of wastewater, and are not substitutes for primary treatment. Tertiary treatment is physical and/or chemical removal of pollutants that are not removed by conventional biological processes. Such pollutants typically include dyes and other recalcitrant organic pollutants.

Figure 1:
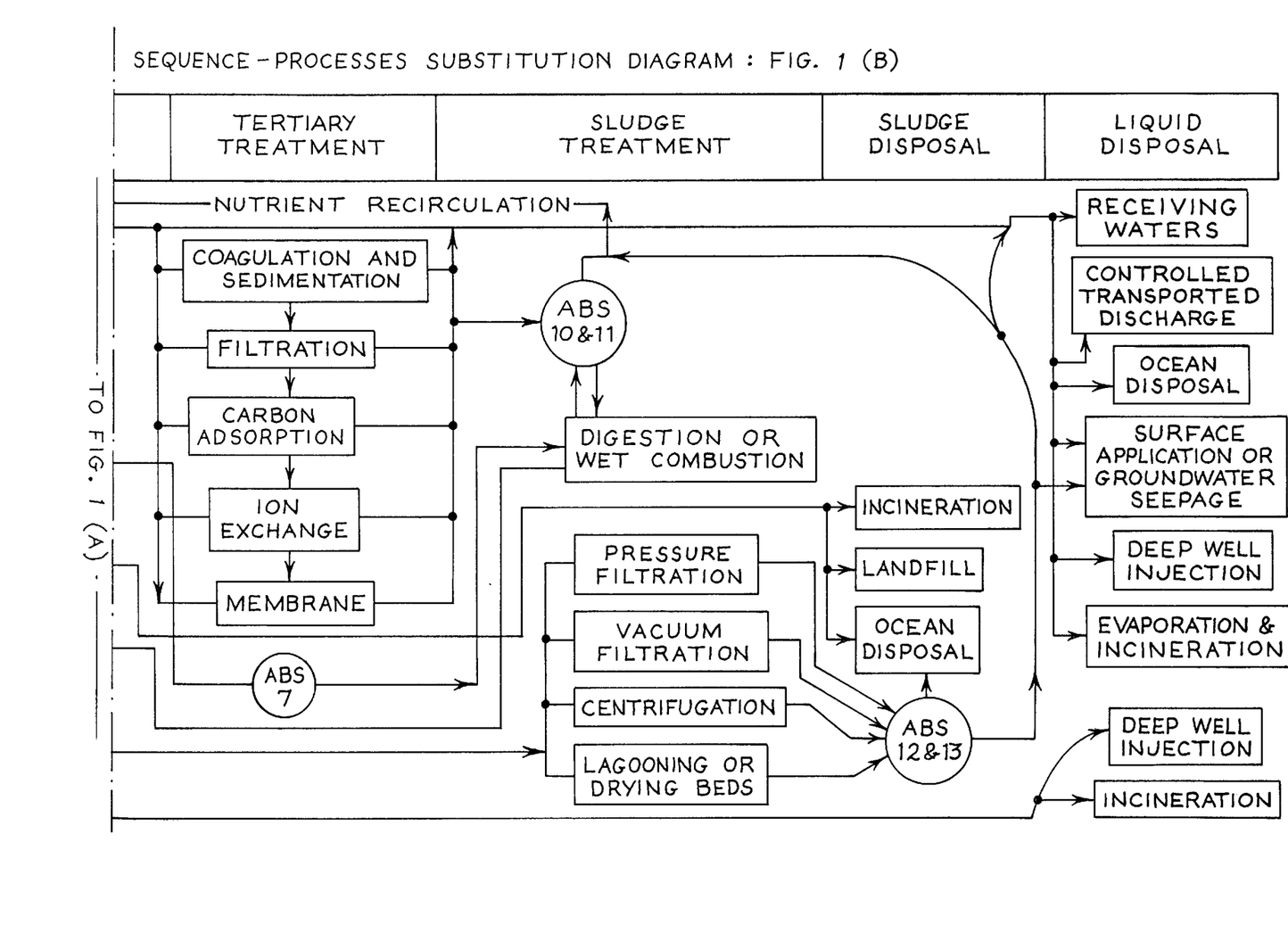
FIGS. 1A, 1B, 2A and 2B are flow charts showing steps in waste treatment processing. "ABS #" denotes positions at which a microorganism disruption step to release nutrients for recirculation in accordance with the present invention can be implemented.
Figure 1A:
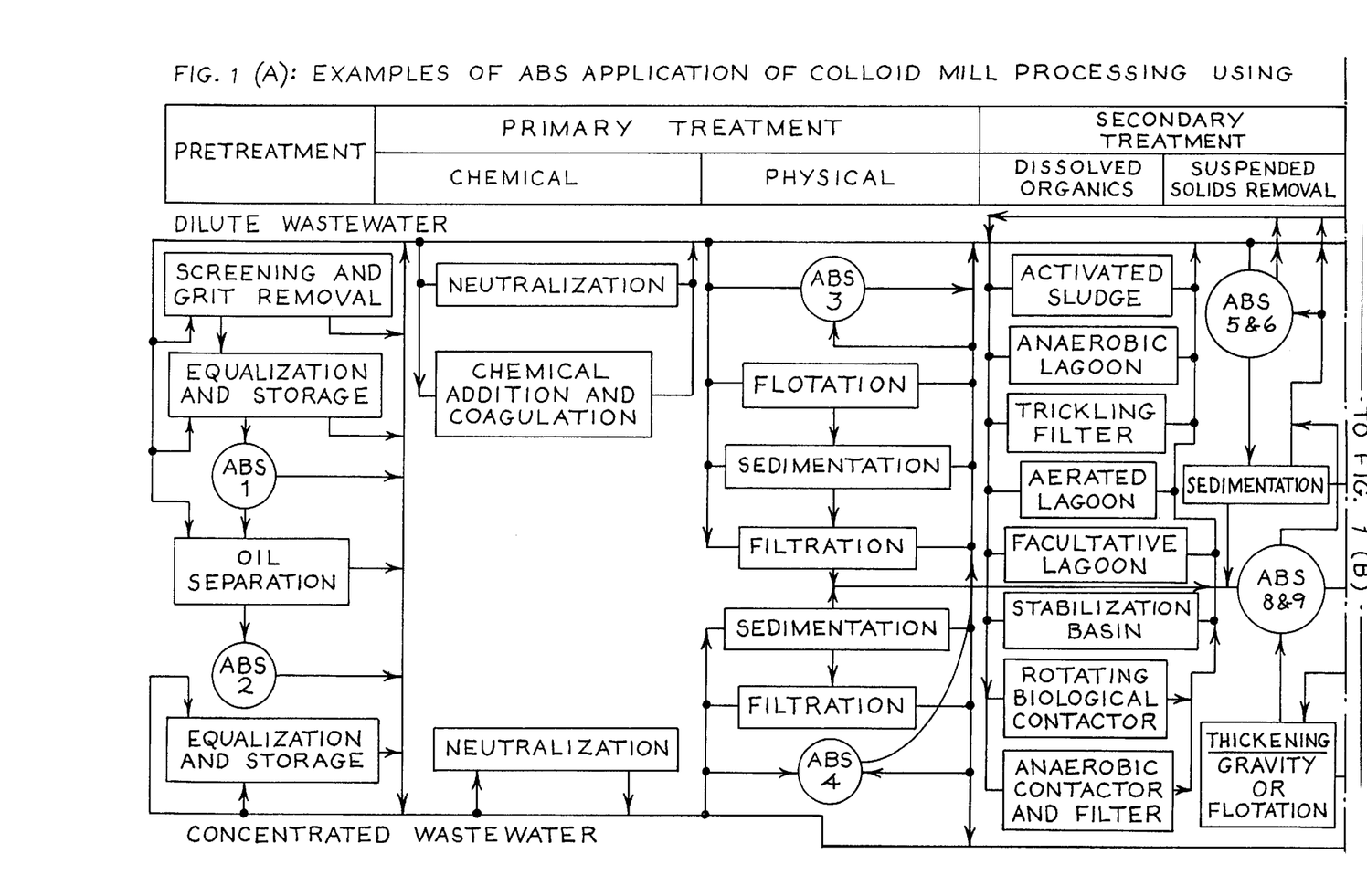
Figure 2A:
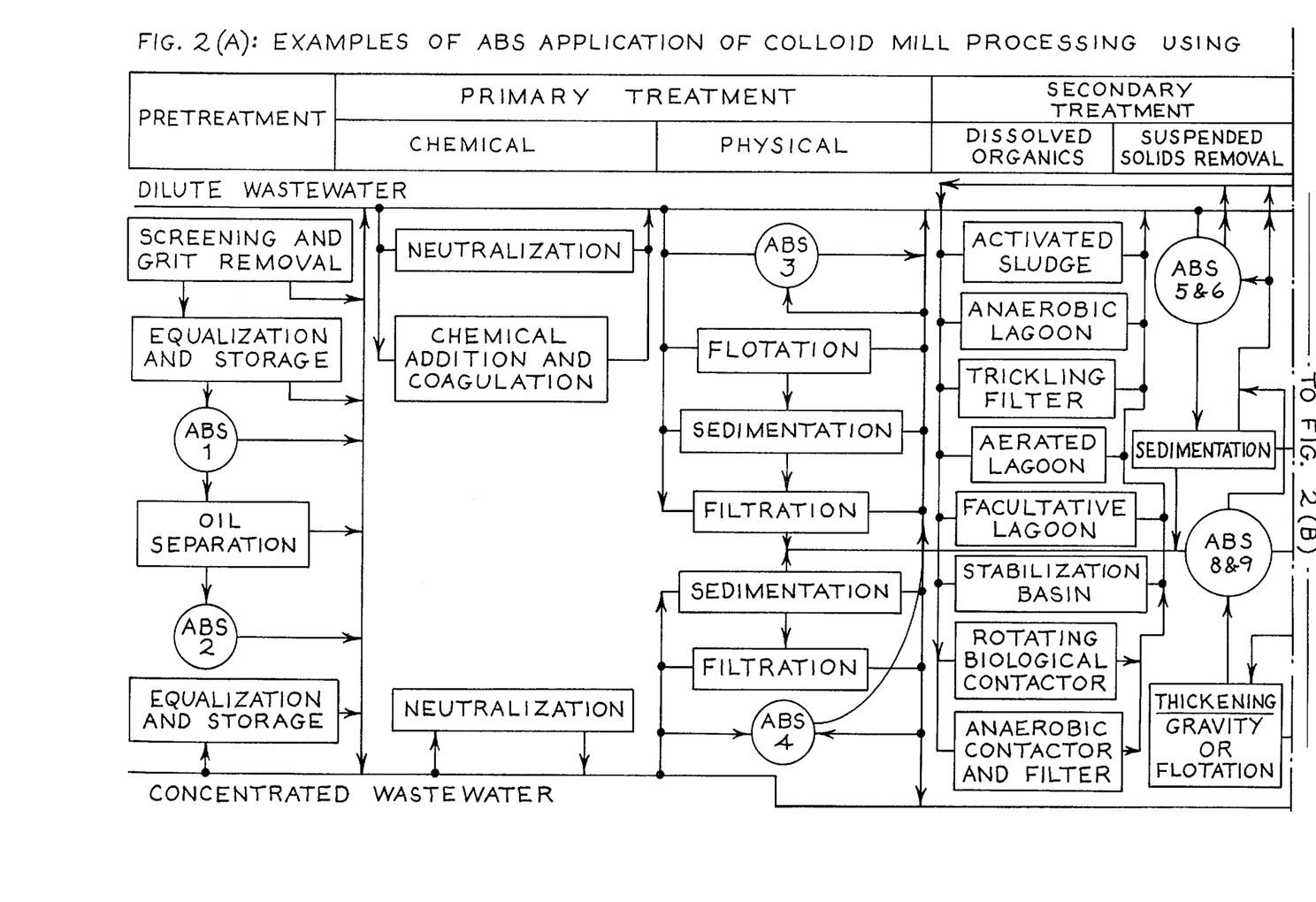
Figure 2B:
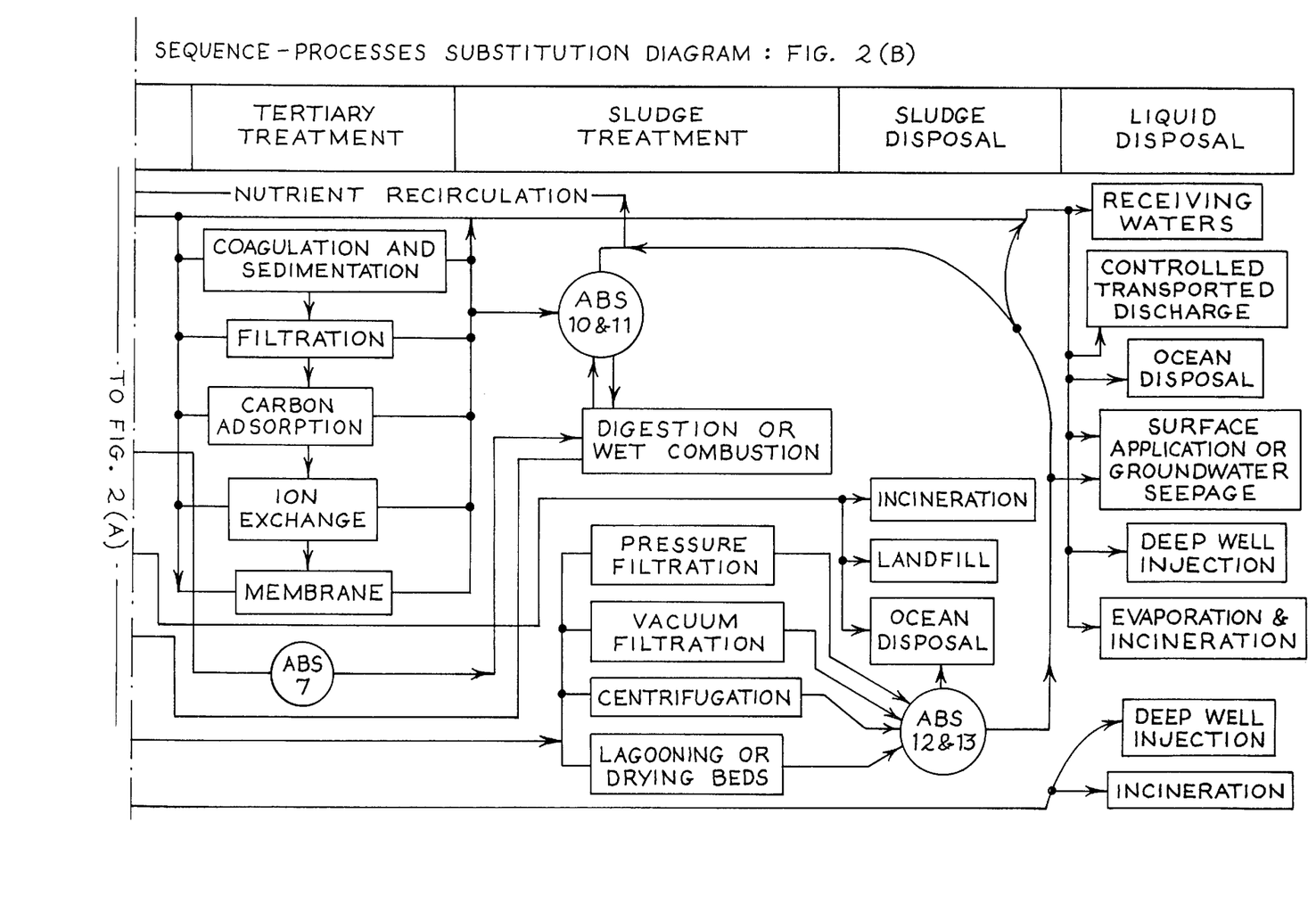

Pretreatment includes screening and grit removal, equalization and storage and optionally oil separation. A mechanical shearing step in accordance with the present invention can be implemented either before (ABS 1) or after (ABS 2) the oil separation step, as shown in FIG. 1. During waste pretreatment processing, emulsification and/or dispersion is used to enhance physical removal and/or biodegradation of oleaginous or oily sludges, such as tank bottoms from oil storage tanks. For example, in ABS 1 tank bottoms from oil storage tanks are transferred to a holding tank and dispersed with a mechanical shearing device. By adding a surfactant a uniform emulsion is obtained prior to flotation by dissolved air flotation (DAF) and/or treatment of emulsified materials biologically.

Primary treatment includes both chemical processes, such as neutralization and chemical addition and coagulation, and physical processes, such as flotation, sedimentation and filtration. A mechanical shearing step, which produces a particle size distribution wherein a substantial proportion of particles are about 2 microns or less, in accordance with the present invention, can be implemented as one of the physical steps in primary treatment, as shown in FIG. 1. Mechanical shearing can be applied to oleaginous plant or vegetable type sludges (paper mill primary sludges), to municipal sludges, and to other industrial sludges from primary processes. In ABS 3 liquid waste material is mechanically sheared prior to flotation by DAF in order to disperse and emulsify the components, and then is sent on to secondary treatment or to final disposal. In ABS 4, concentrated sludge is fractionated by mechanical shearing, and then is sent on to secondary treatment or to final disposal. If primary concentrated sludges are to go directly to final ocean disposal, they may be fractionated in ABS 8.

There are various biological or secondary treatment processes for wastewater. Perhaps the most commonly used is a conventional activated sludge process. This process uses an aeration tank, a secondary clarifier, and a sludge recycle line, through which a portion of the concentrated sludge is recycled and mixed with additional wastewater. The activated sludge process is a continuous system in which aerobic biological growths are mixed and aerated with wastewater in the aeration tank and separated by gravity in the secondary clarifier. This process, or one of its many modifications, is most often used for large installations.

There are many modifications of this process. The conventional process employs long rectangular aeration tanks, which approximate plug-flow with some longitudinal mixing and with cellular recycle. Returned sludge is mixed with the wastewater in a mixing box or chamber a the head end of the aeration tank. Sludge wasting is accomplished from the recycle or mixed-liquor line. Both influent settled wastewater and recycled sludge enter the tank at the head end and are aerated for a period of about 6–8 hours. The influent wastewater and recycled sludge are mixed by the action of diffused or mechanical aeration, which is constant as the mixed liquor moves down the tank. During this period, adsorption, flocculation, and oxidation of the organic matter take place. The mixed liquor is settled in the activated sludge settling tank, and sludge is returned at a rate of approximately 50 to 150 percent of the influent flow rate.

Other forms of activated sludge processing include tapered aeration, continuous-flow stirred-tank, step aeration, modified aeration, contact stabilization, extended aeration, an oxidation ditch, the carousel process, the Kraus process, high-rate aeration, pure oxygen and diffused-air aeration, although some of these modifications differ so much from conventional activated sludge processing that not all waste treatment scientists consider them still within the boundaries of activated sludge processing. Contact stabilization is applicable where a major portion of the BOD is present in colloidal or suspended form. As a general rule, the process should be considered when 85 percent of the $BOD_5$ is removed after 15 minutes of contact with aerated activated sludge. The effluent suspended solids are of the same order as those obtained from activated sludge. Extended aeration or total oxidation produces an effluent with a soluble $BOD_5$ of less than 10 to 15 mg/l and a total $BOD_5$ of less than 40 mg/l. The suspended solids carryover may run as high as 50 mg/l. High clarity (low solids) effluent usually requires posttreatment by filtration, coagulation, and the like. This process is usually considered for waste flows less than 1 MGD.

There are three basic classifications of activated sludge processes, as defined by the process loading range or the organic matter available to the microorganisms. That is, an activated sludge process can be classified as a high rate, conventional rate or low rate process.

An activated sludge process typically produces an effluent with a soluble $BOD_5$ (Biochemical Oxygen Demand Exerted over 5 days at 20° C.), of less than 10–30 mg/l, and a total $BOD_5$ of less than 30 mg/l, including carryover of suspended solids. The organic concentration of the effluent in terms of Chemical Oxygen Demand ("COD") may be as high as 500 mg/l, depending on the concentration of bioresistant compounds originally present in the wastewater. An activated sludge process requires treatment and disposal of excess sludge and is generally considered for use where high effluent quality is required, available land area is limited, and waste flows exceed 0.1 million gallons per day (MGD).

An activated sludge process primarily is employed for the treatment of domestic wastewater. When employing an activated-sludge process to treat industrial wastewaters, there are many impurities such as oil and grease which must be removed or altered by preliminary treatment before subsequent activated sludge treatment can be considered. Fractionation in accordance with the present invention is useful at this point to enhance physical removal and/or biodegradation of oleaginous or oil sludges.

Another method of wastewater treatment involves the use of lagoons, which may be aerated or anaerobic. Lagoons are large basins in which wastewater is treated on a flow-through basis.

An aerated lagoon is a basin, typically 8 to 16 feet deep, in which wastewater is treated on a flow-through basis, with or without solids recycle. Oxygen is usually supplied by means of surface aerators or diffused-air aeration units. The action of the aerators and that of the rising air bubbles from the diffuser are used to keep the contents of the basin in suspension. The contents of an aerated lagoon are mixed completely, and neither the incoming solids nor the biological solids produced from waste conversion settle out. Depending on the detention time, the effluent contains about one-third to one-half the value of the incoming BOD in the form of biomass. Before effluent can be discharged from an aerated lagoon, the solids must be removed by settling, with a settling tank or basin being a normal component of most lagoon systems.

An aerated lagoon typically produces effluent soluble $BOD_5$ of less than 25 mg/l with a total $BOD_5$ of less than 50 mg/l, depending on the operating temperature. The effluent suspended solids may exceed 100 mg/l. The system is temperature sensitive and treatment efficiencies decrease during winter operation, and solids return is often used to improve performance during winter months. Post-treatment is necessary if a highly clarified effluent is desired. Large land areas are required for the process.

There are two types of aerated lagoons. The first of these types is the aerobic lagoon, in which dissolved oxygen and suspended solids are maintained uniformly throughout the basin. The second of these types is the aerobic-anaerobic or facultative lagoon, in which oxygen is maintained in the upper liquid layers of the basin, but only a portion of the suspended solids is maintained in suspension.

In an aerobic lagoon, all solids are maintained in suspension and this system may be thought of as a "flow-through" activated sludge system without solids recycle. The effluent suspended solids concentration is equal to the aeration basin solids concentration. In most cases, separate sludge settling and disposal facilities are required. An aerobic lagoon is only applicable where partial treatment (approximately 50 to 60 percent $BOD_5$ reduction) and high effluent suspended solids are permissible. For this reason, it should be considered as a stage development that can be converted into an extended aeration plant at some future date by the addition of a clarifier, return sludge pump, and additional aeration equipment, or for pretreatment of an industrial wastewater prior to discharge to a municipal treatment plant.

In the facultative lagoon, a portion of the suspended solids settle to the bottom of the basin where they undergo anaerobic decomposition. The anaerobic by-products are subsequently oxidized in the upper aerobic layers of the basin. The facultative lagoon can also be modified to yield a more highly clarified effluent by including a separate post-settling pond or a baffled settling compartment.

Aerobic and facultative lagoons are primarily differentiated by the power level employed in the basin. In an aerobic lagoon the power level is sufficiently high to maintain all solids in suspension and may vary from 14 to 20 horsepower per million gallons (2.3 to 3.9 $W/m^3$) of basin volume, depending on the nature of the suspended solids. Field data demonstrate that 14 horsepower per million gallons (3.9 $W/m^3$) are required for domestic wastewater treatment. In a facultative lagoon the power level is much lower, and is only sufficient to maintain dispersion and mixing of the dissolved oxygen.

Anaerobic lagoons also may be used in wastewater treatment. Temperature is one of the most significant variables effecting anaerobic process performance. In addition, high concentrations of inorganic salts may result in temporary or permanent inhibition of an anaerobic fermentation process. Heavy metals such as copper, zinc, nickel, and chromium may cause inhibition depending on the state of the material, its solubility, and possible precipitation in the process by combination with sulfide. The optimum conditions for maintaining maximum rates of methane fermentation in an anaerobic system are summarized in Eckenfelder (1980).

A further method of wastewater treatment uses high-rate trickling filters. The most common type is a percolating filter which consists of a basin with side walls 5 to 6 feet deep and a slightly sloping floor to permit free drainage. The basin is filled with some durable material, preferably with pores to give a large surface area per unit volume. Settled sewage, when sprayed evenly onto the surface of this medium, leads to the establishment on the filter medium of a slime film that contains colonies of the necessary biological organisms to oxidize the impurities in the sewage to stable substances.

Trickling filters can remove up to about 85 percent of the influent $BOD_5$ from domestic sewage. Roughing filters at high loadings can remove 50–60 percent of influent $BOD_5$ when treating soluble organic industrial wastes.

A further type of wastewater treatment uses anaerobic and facultative ponds for industrial waste treatment. Ponds and stabilization basins are the most common method of treatment where large land areas are available, where odors will not cause a nuisance, and where high quality effluent is not required at all times, and are distinguished from lagoons by the absence of continuous flow. A stabilization pond is a relatively shallow body of water contained in an earthen basin of controlled shape, which is designed for the purpose of treating wastewater. The term "oxidation pond" is often used.

Ponds have become very popular in small communities because their low construction and operating costs offer a significant financial advantage over other recognized treatment methods. Ponds are also used extensively for wastewater and mixtures of industrial and domestic wastewater that are amenable to biological treatment. Ponds are the most common method of treatment in developing countries and for small installations. Installations are now servicing such industries as oil refineries, slaughterhouses, dairies, poultry-processing plants, and rendering plants.

Ponds can be divided into two general classifications, the impounding and absorption basin, and the intermittent flow-through basin. In the impounding and absorption basin, either there is no overflow or there is intermittent discharge during periods of high stream flow. Where there is no overflow, the volumetric capacity of the basin is equal to total waste load less losses by evaporation and percolation. In an intermittent discharge pond, required capacity is related to the stream flow characteristics. In view of the large area requirements, impounding basins are usually limited to industries discharging low daily volumes of wastewater in high evaporation geographical areas, to seasonal operations such as the canning industry, and to cases where the total inorganic dissolved solids level must be regulated for discharge to the receiving water. If high degree treatment is required, these ponds must be followed by an aerobic treatment, such as an aerated lagoon or an activated sludge process.

Other methods of secondary treatment are the rotation biological contactor and the anaerobic contactor and filter.

One or more fractionation steps in accordance with the present invention can be implemented before or after the suspended solids removal phase of secondary treatment, as shown in FIG. 1. For example, in ABS 9 thickened secondary sludges are transferred to a holding tank and fractionated so that the particle size distribution produced has a substantial proportion of particles of a size about 2 microns or less with a mechanical shearing device such as a ball or colloid mill to disperse and disrupt secondary sludge prior to recirculation of the liquor containing nutrients and BOD to a secondary treatment process, such as an aerated lagoon. Fractionation is particularly beneficial in connection with secondary processes, including aerobic processes, such as activated sludge processes, lagoons, trickling filters, high rate towers and rotating biological contactors, as well as anaerobic and facultative processes. The inventive process accelerates the rate of biodegradation of organic pollutants, and recirculation of nutrients released by cell lysis in connection with secondary processes increases availability of nutrients to microbes used in these biological processes, thus reducing or eliminating the need for replenishment of nutrients.

Reading from top to bottom on FIG. 1, ABS 5 takes biological sludge that contains approximately 3000 mg/l solids directly from the biological treatment step, before it is sent to the secondary clarifier. Reading from bottom to top on FIG. 1, ABS 6 takes sludge after sedimentation has occurred and sludge has been thickened to contain approximately 6000 mg/l solids. In both ABS 5 and ABS 6, there is recirculation of released nutrients to the biological treatment step, and in each case fractionation is applied to a slip stream from the main waste stream.

Following sedimentation in the secondary clarifier, the waste stream may be sent to a thickening step using gravity or flotation. Following this step, the waste stream may be fractionated in ABS 9 (reading from bottom to top on FIG. 1), before being sent on to tertiary treatment. Alternatively, the waste stream may be sent directly to ABS 7, and from there to an anaerobic digester for sludge. Fractionation prior to anaerobic digestion increases the rate of digestion of sludge, and to this end a further fractionation step, ABS 10, may be employed in a closed loop with the anaerobic digester, without nutrient recirculation.

After secondary treatment, wastewater can be further processed by tertiary treatment. Tertiary treatment includes coagulation and sedimentation, filtration, carbon adsorption, ion exchange and membrane steps. Following tertiary treatment there can be a further fractionation step to levels of 2 microns or less in accordance with the present invention, prior to sludge treatment and disposal. Tertiary sludges can be fractionated in ABS 11, with recirculation of nutrients to a secondary treatment step. In ABS 11 anaerobic sludge is transferred to a holding tank and fractionated with a mechanical shearing device and then is returned to the anaerobic system.

Alternatively, processed wastewater can proceed directly from secondary treatment to the final steps of sludge treatment and disposal. Sludge treatment processes producing combined sludges, or concentrated/thickened or digested sludges, also benefit from disruption/lysis to enhance sludge disposal, biodegradation and nutrient recirculation, and the process according to the invention reduces or eliminates the need for chemical treatment for thickening and sludge disposal. For example, combined primary and secondary concentrated sludges can be fractionated, with nutrient recirculation (ABS 12) or without nutrient recirculation (ABS 13) to a secondary treatment step.

Aerobic organisms require minimum quantities of nutrients. Nutrients include macronutrients, those nutrients such as nitrogen and phosphorus that are required in large quantities by microorganisms and micronutrients or trace ingredients, those nutrients that are required in smaller quantities than nitrogen or phosphorus. Nitrogen and phosphorus are frequently deficient in industrial wastewaters and must be added as a nutrient supplement. Nutrient requirements vary with solids retention time, the average length of time biomass stays in a system, but a suitable estimate is to provide a BOD:N:P of 100:5:1.

Exemplary of systems in which fractionation according to the invention is useful is a system for processing wastewater from a kraft mill. Such a system typically would include an activated sludge system consisting of primary sedimentation for removal of fiber solids followed by an aeration basin and secondary clarifier with recycle of the underflow solids to the aeration basin and discharge of clarified effluent. Deliberate wastage of secondary solids from the return activated sludge is usually thickened in a DAF then mixed with primary solids in a blend tank prior to dewatering on a belt press. The thickened sludge is commonly disposed of in a landfill or is incinerated.

A fractionation step in such a process might be included as part of an internal recycle loop off the outlet of the aeration basin and utilize a holding tank for control of feed stock mixed with various proportions of a waste stream called black liquor from the kraft mill (a highly caustic solution containing sodium hydroxide). After a predetermined exposure time to the black liquor the sludge is processed by using a mechanical shearing device, such as a colloid mill.

The subsequent liquor contains essential nutrients from the contents of ruptured cells, including vitamins, DNA, RNA, proteins, carbohydrates and lipids. These nutrients are returned to the head of the activated sludge system. This recycle of essential nutrients is continued, thereby reducing and in some cases even eliminating the cost of supplemental nitrogen to the system in the form of aqueous ammonia and supplemental phosphorus in the form of phosphoric acid. For a typical mill without a fractionation step, the estimated cost of nutrient supplementation is in the range of $200,000–$500,000 per year.

Many paper mills in the southeastern United States operate single pass aerobic and/or facultative lagoons, which may or may not have a secondary clarifier. In cases where secondary clarifiers are in place, a fractionation step can be inserted with a holding tank to collect sludge after concentration in the secondary clarifier. Fractionation can combine shear with the use of a chemical or biochemical agent, depending on the specific nature of the biomass. The fractionated liquor is recycled to the head of the system for recycle of nutrients. In cases where no clarifier exists, either benthic sludge is removed, or a solid/liquid separation step is inserted to collect sludge. A fractionation step with holding tank and recycle to head of the system is inserted again.

Another example of a system in which mechanical shearing according to the invention can be used is a municipal waste treatment system, which includes treatment of both primary, secondary and concentrated anaerobic sludges prior to anaerobic digestion. In such a system, a holding tank can be inserted to receive a blend of these sludges in various proportions depending on the site and the location of the fractionation step. In many instances it is economic to use methane from the anaerobic digestion of sludge to provide heat pretreatment of the sludge prior to shearing using a mechanical device. In addition, a fractionation step may be inserted for final disposal of the anaerobic sludge to the main aerobic treatment system. On a site specific basis, this may negate the need for other final disposal methods.

The present invention will be illustrated in further detail in the following examples. These examples are included for illustrative purposes and should not be considered to limit the present invention.

EXAMPLE 1

Processing of Kraft Mill Sludge (ABS 5)

A kraft mill discharges wastewater to a primary sedimentation tank which removes 80% of the influent total suspended solids (TSS). The clarified effluent has a BOD of 100,000 lbs per day which is treated using a conventional activated sludge system. The activated sludge process consists of an aeration basin and secondary clarifier with recycle of the underflow solids to the aeration basin and discharge of clarified effluent. Deliberate wastage of secondary solids from the return activated sludge (RAS) is concentrated in a DAF then mixed with primary solids in a blend tank prior to dewatering on a belt press. The thickened sludges are disposed of to an on-site landfill.

ABS 5 is located as a slip stream off the RAS line forming part of the internal recycle loop. A holding tank with a capacity to hold 1–2 days sludge is located ahead of ABS 5 for control of the feed rate. This sludge is mixed with 1–5% black liquor wastewater from the kraft mill (a highly caustic solution containing sodium hydroxide). The sludge is exposed to the black liquor during storage and subsequently processed by using a mechanical shearing device such as a ball mill or colloid mill. The subsequent liquor containing essential nutrients from the ruptured cells including vitamins, DNA, RNA, proteins, carbohydrates and lipids is returned to the head of the activated sludge system. This recycle of essential nutrients is continued, and reduces or eliminates the need for supplementing nitrogen as aqueous ammonia and phosphorus as phosphoric acid.

The cost of nutrient supplementation for the mill can be calculated knowing the influent BOD to the activated sludge system and rate of nutrient supplementation for the mill. The primary effluent at this kraft mill contains on average 100,000 lbs of BOD/d, and nutrients are supplemented in the ratio of 100:5:1 as BOD:N:P. Based on a requirement of 5000 lbs/d of nitrogen at $0.1336/ton and 1000 lb/d of phosphorus at $0.609/ton, the cost of nutrient supplementation would $466,105/year for the mill. According to Eckenfelder, supra, 12.3% of the 20.3% cell nitrogen and 2.6% of the 3.6% cell phosphorus is available for recycle as bioavailable nutrient.

Fractionation of the sludge using ABS 5 releases for recirculation 60.5% of the nitrogen and 72.2% of the phosphorus. At this mill the sludge yield is 0.5 lbs VSS/lb BOD removed and % BOD removal 90%, which results in 45,000 lbs of excess sludge per day of which 5,000 lbs is lost in the final effluent. On fractionation this sludge releases bioavailable nutrients in the order of 4920 lbs/d nitrogen and 1040 lbs/d of phosphorus, which meets the requirements for nutrient supplementation. This saves the mill $466,105/yr in nutrient supplementation.

EXAMPLE 2

Processing of Sludge from a Municipal Waste Treatment System (ABS 11)

A municipal waste treatment system consists of bar screens, grit removal and primary sedimentation followed by a conventional activated sludge treatment. The activated sludge process consists of four aeration lanes with common clarifiers and recycle. Primary and waste secondary sludges are blended and digested anaerobically with excess sludge disposed of by land application. The system treats a population equivalent of 100,000 people and produces 26,400 lbs/d (at 90 g/capita.d) primary sludge, 17600 lbs/d BOD (80 g/capita.d) and 5852 lbs/d secondary sludge (@ yield of 0.35 VSS/lb BOD removed—95% BOD removal). During the ten-day anaerobic digestion process, 30% of the combined sludge is stabilized, leaving 22576 lbs/d for land disposal.

Using ABS 11, a holding tank is inserted to receive a blend of the combined aerobic and anaerobic sludges with a residence time of 8–12 hours. The function of the holding tank is for control and consistency of feed solids to the fractionation step. Sludge solids are fed into a shearing device such as a colloid or ball mill then introduced back into the anaerobic digester. This accelerates the rate of biodegradation of sludge solids due to fractionation, releasing vitamins, DNA, RNA, carbohydrates, proteins and lipids which become readily available for digestion by the anaerobic organisms. Hydrolytic enzymes associated with the biological fraction of the sludge also are released and catalyze further rate limiting reactions such as hydrolysis of complex proteins and lipids.

By removing the rate-limiting step of cell hydrolysis, the anaerobic digestion process stabilizes 50% of the combined sludge in the same time period. In addition, there is an associated increase in methane production from 94,337 $ft^3$ methane/d to 157,228 $ft^3$ methane/d (15 $ft^3$ total gas produce/lb VSS reduced and 65% of the total gas is methane. This provides an additional 60,375,840 BTU/d (at 960 BTU/$ft^3$ of methane) of energy for digester heating, running of the shearing device(s) and providing additional aeration for treatment of the anaerobic liquor. The fractionation step negates the need for land disposal of the anaerobically-stabilized sludge, and the colloidal material contained in the liquor is returned to the aerobic system.

DOCUMENTS CITED

The references listed below are incorporated herein by reference to the extent that they supplement, explain, provide a background for, or teach methodology, techniques and/or compositions employed herein.

"Activated Sludge Manual of Practice", (1987) #OM-9, ISBN 0-43244-97-8.

Aquadec Ltd. (1988), The Seber (Colloid Mill) Process Index.

DIFCO Manual (1984), "Dehydrated Culture Media and Reagents for Microbiology", DIFCO Laboratories, Detroit, Mich. ISBN 84-070512.

Drais News, Draiswerke, Inc., 3 Pearl Court, Allendale, N.J. 07401.

Eckenfelder, Jr., Wesley W. (1980) "Principles of Water Quality Management", CBI Publishing Company, Boston Mass.

EP 293 374

Erickson, U.S. Pat. Nos. 4,159,944; 4,342,650.

Fisk, U.S. Pat. No. 4,053,394.

Gaudy, A. et al. (1971), "Studies of the total oxidation of activated sludge with and without hydrolytic treatment", Journal of the Water Pollution Control Federation (WPCF), 43:1, pp 40–54.

Kelly, F. C. and Hite, K. E. (1955), "Microbiology", Second Edition, Appleton-Century-Crofts Inc. New York. Congress Card # 55-8365.

Kew, U.S. Pat. No. 3,806,448.

Lehninger, A. L. (1975), "Biochemistry", Second Edition, Worth Publishers, New York ISBN 0-87901-047-9.

Levy, J., Campbell, J. J. R. and Blackburn T. H. (1973), "Introductory Microbiology", John Wiley and Sons Inc., New York. ISBN: 0-471-53155-3.

Metcalf and Eddy, as revised by Tchobanoglous, G. (1979) in "Wastewater Engineering Treatment, Disposal and Reuse", McGraw Hill Ltd, New Delhi.

Rich, Linvil G. (1980) Wastewater Treatment Systems, McGraw-Hill, N.Y.

Springer et al. (1993), "Feasibility study of sludge lysis and recycle in the activated sludge process," (Abstract) Proc. TAPPI International Environmental Conference, pp. 761–770.

Whiteman, G. R. (1985), "Filamentous and Dispersed Growth in Anaerobic Systems", Ph.D. Thesis.

What is claimed is:

1. A method of treating a waste stream, comprising the steps of:

subjecting a waste stream to a secondary, biological treatment step in which organic components in the waste stream are transformed into biomass; then fractionating the biomass by mechanical shearing by a force that produces a substantial proportion of particles of about 2 microns or less such that the microbial cells in the biomass are sheared allowing nutrients to be released from the cells; and recirculating the nutrients released by the fractionating of the biomass to be used in the biological treatment step.

2. A method according to claim 1, additionally comprising a step of pretreating the biomass with at least one of chemicals, biochemicals and heat.

3. A method according to claim 2, wherein the waste stream is processed in a secondary, biological treatment step without nutrient supplementation.

4. A method according to claim 1, additionally comprising a step of concentrating output from the secondary, biological treatment step in a secondary clarifier, wherein the step of fractionating the biomass is between the step of secondary, biological treatment and the step of concentrating output of the secondary, biological treatment step in the secondary clarifier.

5. A method according to claim 4, additionally comprising a step of recirculating nutrients released by fractionation of the biomass to the biological treatment step.

6. A method according to claim 1, additionally comprising a step of concentrating output from the secondary, biological treatment step in a secondary clarifier, wherein the step of fractionating the biomass is after the step of concentrating output of the secondary, biological treatment step in the secondary clarifier.

7. A method according to claim 6, additionally comprising a step of recirculating nutrients released by fractionation of the biomass to the biological treatment step.

8. A method according to claim 1, additionally comprising a step of concentrating output from the secondary, biological treatment step in a secondary clarifier followed by thickening in a gravity or flotation step, wherein the step of fractionating the biomass is after the gravity or flotation step.

9. A method according to claim 1, additionally comprising steps of concentrating output from the secondary, biological treatment step in a secondary clarifier, fractionating output of the secondary clarifier, treating the fractionated output of the secondary clarifier in an anaerobic digester and recirculating nutrients released by the fractionating to the biological treatment step.

10. A method according to claim 9, additionally comprising a step of mechanically shearing contents of the anaerobic digester.

11. A method according to claim 1, additionally comprising a step of tertiary treatment and a step of mechanically shearing output of the tertiary treatment step.

12. A method according to claim 1, additionally comprising the step of pretreating the biomass with an industrial waste stream, or a slip stream thereof.

13. A method according to claim 12, wherein the industrial waste stream is a waste stream from a kraft mill.

14. The method of claim 1, wherein mechanical shearing is achieved by a ball mill device.

15. A method of treating a waste stream, comprising the steps of:

collecting sludge from the waste stream after a biological treatment step;

fractionating the sludge by mechanically shearing the sludge by a force that produces a substantial proportion of particles of about 2 microns or less to disrupt microorganisms within the sludge so that nutrients are released from within the microorganisms; and recirculating the nutrients released by fractionating the sludge to the biological treatment step.

16. A method according to claim 15, additionally comprising a step of treating the sludge with at least one of chemicals, biochemicals and heat.

17. A method for treating sludge from a municipal waste system, comprising the steps of:

(a) receiving a blend of sludge produced by an anaerobic digester acting on primary and waste secondary sludges, said digester comprising microbial cells;

(b) mechanically shearing the sludge blend by a force that produces a substantial proportion of particles of about 2 microns or less, so that microbial cells within the sludge are disrupted to the extent that nutrients within the cells are released and recirculated for use in the sludge treating method; and (c) returning the sheared sludge blend to the anaerobic digester.

18. A closed loop system of sludge recirculation, comprising the steps of a. subjecting a waste stream to a secondary, biological treatment step in which organic components in the waste stream are transformed into biomass;

b. pretreating the biomass with at least one of the group consisting of chemicals, heat and biochemicals;

c. fractionating the biomass by mechanical shearing using a force that produces a substantial proportion of particles of about 2 microns or less such that the microbial cells in the biomass are sheared allowing nutrients to be released from the cells; and d. recirculating the nutrients released by the fractionating of the biomass to be used in the biological treatment step a, thereby forming a closed loop.

19. A method according to claim 18, wherein the secondary, biological treatment step is an anaerobic or facultative treatment step.

20. A method according to claim 19, wherein the biomass is combined primary and secondary sludges.

* * * * *